United States Patent
Barnard

(10) Patent No.: US 10,310,556 B2
(45) Date of Patent: Jun. 4, 2019

(54) INFORMATION HANDLING SYSTEM MULTI-TORQUE DUAL AXIS HINGE

(71) Applicant: Dell Products L.P., Round Rock, TX (US)

(72) Inventor: Christopher T. Barnard, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 99 days.

(21) Appl. No.: 15/711,023

(22) Filed: Sep. 21, 2017

(65) Prior Publication Data

US 2019/0086956 A1 Mar. 21, 2019

(51) Int. Cl.
*G06F 1/16* (2006.01)
(52) U.S. Cl.
CPC .................. *G06F 1/1618* (2013.01)
(58) Field of Classification Search
CPC ....................................................... G06F 1/1618
USPC ........................... 361/679.27, 679.01, 679.09
See application file for complete search history.

(56) References Cited

U.S. PATENT DOCUMENTS

| 9,677,308 B1* | 6/2017 | Chen | E05D 3/18 |
| 2006/0133052 A1* | 6/2006 | Harmon | G06F 1/1616 361/752 |
| 2012/0047685 A1* | 3/2012 | Ma | G06F 1/1681 16/319 |
| 2013/0208406 A1* | 8/2013 | Lin | G06F 1/1681 361/679.01 |
| 2014/0373654 A1* | 12/2014 | Hsu | G06F 1/1618 74/96 |
| 2015/0212553 A1* | 7/2015 | Park | G06F 1/1681 361/679.27 |
| 2016/0010375 A1* | 1/2016 | Rittenhouse | G06F 1/1618 361/679.27 |
| 2016/0041589 A1* | 2/2016 | Tazbaz | G06F 1/1637 361/679.06 |
| 2016/0048174 A1* | 2/2016 | Hsu | G06F 1/1681 16/342 |
| 2017/0357294 A1* | 12/2017 | Siddiqui | G06F 1/1616 |

* cited by examiner

*Primary Examiner* — Rockshana D Chowdhury
(74) *Attorney, Agent, or Firm* — Zagorin Cave LLP; Robert W. Holland

(57) ABSTRACT

An information handling system rotationally couples first and second housing portions to each other with a dual axis hinge having proximately located dual axis assemblies with aligned parallel axes. A tensile member routed through each dual axis assembly and coupled to opposing front and rear faces motivate synchronized motion of the parallel dual axis assemblies without a geared mechanism. Torque regions defined by each dual axis assembly coordinate housing portion resistance to rotation at predetermined portions of the relative rotational movement.

14 Claims, 7 Drawing Sheets

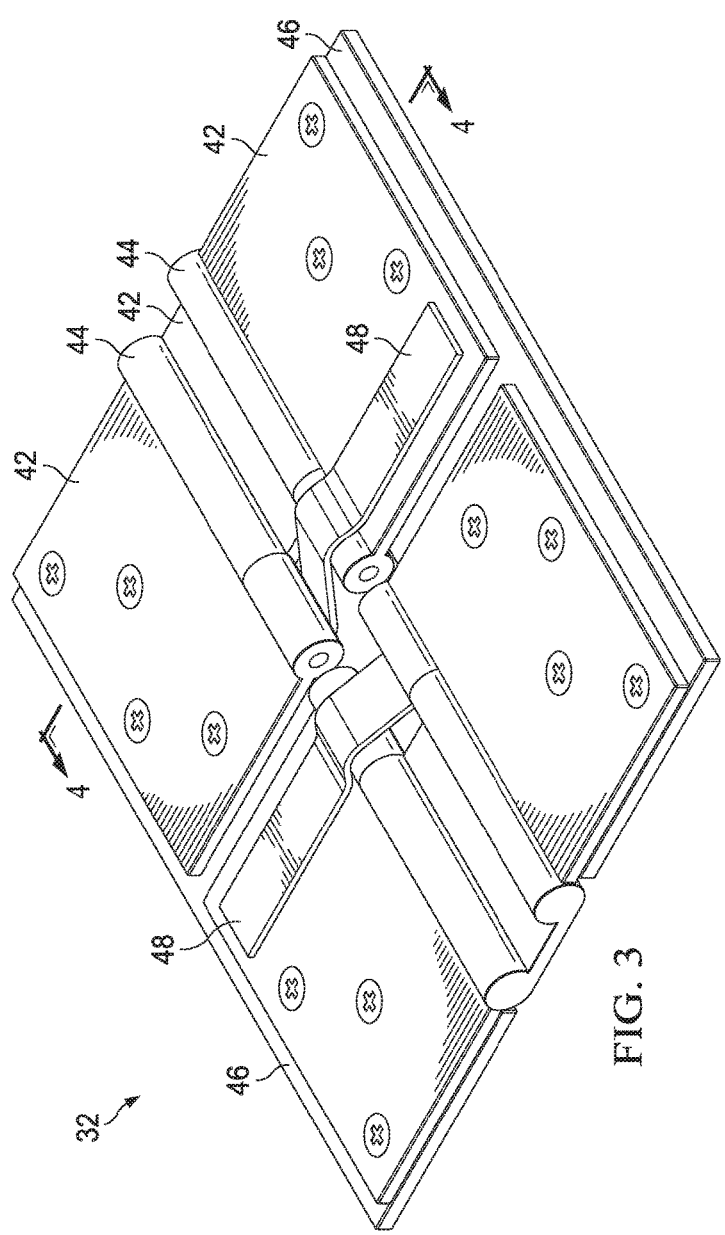
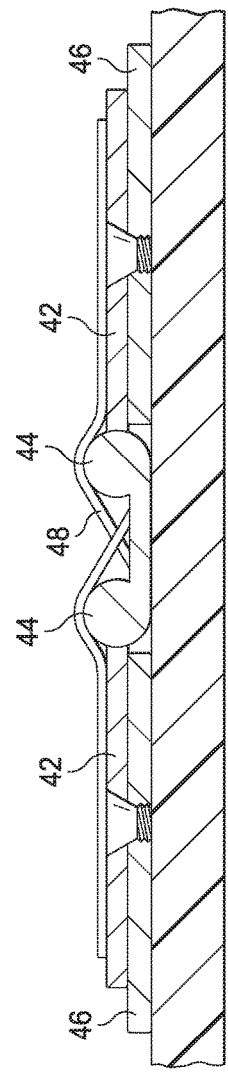
FIG. 3
FIG. 4

INFORMATION HANDLING SYSTEM MULTI-TORQUE DUAL AXIS HINGE

BACKGROUND OF THE INVENTION

Field of the Invention

The present invention relates in general to the field of portable information handling systems, and more particularly to an information handling system NFC multi-torque dual axis hinge.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Portable information handling systems include processing components, a power source and input/output (I/O) devices integrated in a portable housing so that end users can operate the system without cables or peripherals. Tablet information handling systems have a planar housing that typically includes a touchscreen display as the only integrated I/O device. Tablet systems provide a convenient form factor for portability, however, tablets tend to be awkward to handle and interact with. As an alternative or supplement to a tablet information handling system, portable information handling systems sometimes include accessory support systems that couple to the planar housing, such as a rotationally coupled keyboard or a flippable viewing stand that holds the planar housing in a viewing position. Conventional clamshell portable information handling systems generally have an integrated hinge that rotationally couples main and lid portions to each other. In an open position, the main housing portion exposes a physical keyboard that accepts end user keyed inputs while also supporting a display integrated in a lid portion and held in a viewing position. Convertible information handling systems generally include hinges that support a full 360 degrees of rotation that places the integrated display in an exposed tablet position.

Generally end users desire portable information handling systems to have a thin profile that encourages portability. Integrating hinged components within a portable system having a thin profile presents several challenges, such as integrating a viewing kickstand or rotationally coupled housing portions. One challenge is the limited space and tight internal volume requirements defined by thin Z height housings. Another challenge is that typical hinges must adapt to several rotational orientations by providing enough torque to keep the housing portions in position relative to each other, often at multiple viewing angles. To enhance usability, torque required to rotate hinged components should increase at angles desired for viewing and decrease where an end user is less likely to want to hold housing portions in fixed relative orientation. For example, typical hinge constraints call for 180 to 360 degrees of rotation supported in a thin profile housing with increased torque to hold a display in position at several different rotational orientations. Often the many constraints defined for hinge motion and relative rotational positions result in expensive hinge components that are difficult to manufacture and not robust enough to withstand repeated rotational movements. In many cases the hinges drive the information handling system housing design, such as by limiting the location and size of a display bezel and requiring minimal housing thicknesses.

SUMMARY OF THE INVENTION

Therefore, a need has arisen for a system and method which rotationally couples information handling system housing portions to each other within constrained vertical height.

In accordance with the present invention, a system and method are provided which substantially reduce the disadvantages and problems associated with previous methods and systems for rotationally coupling housing portions to each other. Plural dual axis assemblies coupled to the housing portions coordinate torque regions at relative rotational positions synchronized by tensile members coupled to front and rear faces of each dual axis assembly.

More specifically, an information handling system processes information with processing components integrated in a housing and presents the information as visual images at a display. The housing includes rotationally coupled components that cooperate to hold the display in desired viewing positions. For example, a lid portion integrates a display and rotates to a viewing position relative to a main portion; or a stand portion rotates relative to a main portion that integrates a display so that the stand holds the display in a viewing position. A hinge provides low profile synchronized motion with a pair of hinge assemblies coupled to the housing portions in a parallel manner, such as with a base plate on each opposing hinge assembly portion. A tensile member coupled to opposing sides of each hinge assembly synchronizes motion of the hinge assembly dual axes across each hinge assembly without any gear structures and adding minimal vertical height to the hinge. Torque regions are managed throughout the range of hinge motion by locating different friction relationships at each axis of each hinge assembly. Selecting dual axis hinge assemblies with desired torque regions adapts the hinge to have desired high torque regions at relative rotational positions associated with information handling system display viewing orientations.

The present invention provides a number of important technical advantages. One example of an important technical advantage is that a hinge solution integrates with information handling system housing components for a robust and compact portable system. Torque varies from zero to substantial values, such as 8 kgfm, across a range of relative angular positions to provide end users with convenient fixed positions that hold the system in viewing positions. A low profile design without gears reduces complexity and cost while improving robustness over multiple rotational cycles. Parallel double axis hinge sets combine varied torque setting to adapt rotational movement for particular needs while high tensile filaments interconnect hinge portions to synchronize movement of the dual axes configurations across multiple parallel hinge assemblies. The hinge provides an inexpensive and adaptable solution for information handling systems with low profile height constraints and also fits well in protective covers to operate as a kickstand that elevates the display for viewing.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

FIG. 3 depicts a side perspective view of a two dual axis hinge assemblies forming a hinge over interconnecting base plates;

FIG. 4 depicts a side cutaway view of the hinge having tensile members coupled to opposing faces of each dual axis hinge assembly;

DETAILED DESCRIPTION

An information handling system rotationally couples housing portions to each other with a hinge having parallel dual axis hinge assemblies synchronized in motion by tensile members coupled to opposing faces of each dual axis hinge assembly. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
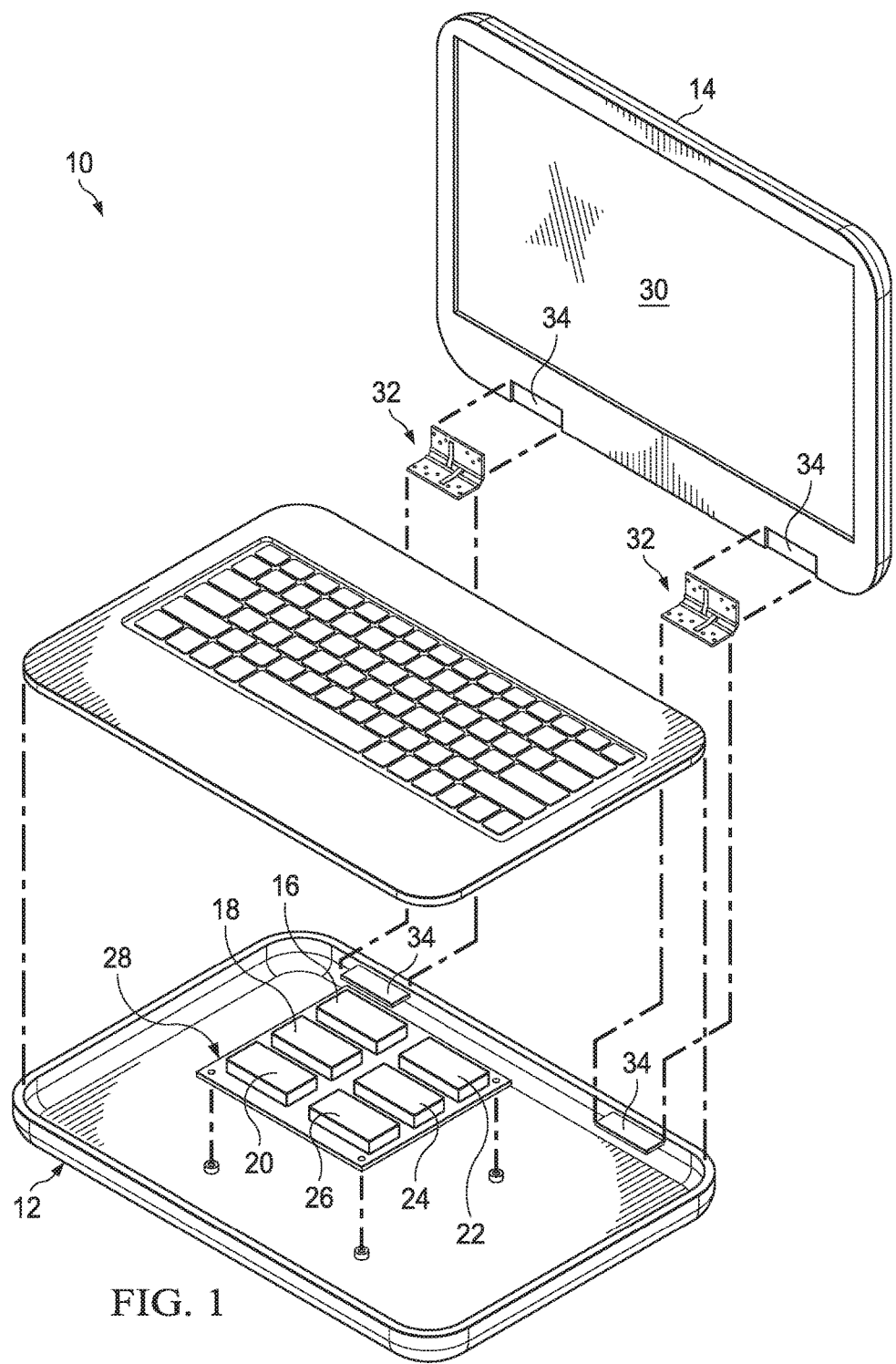
FIG. 1 depicts a block diagram of an information handling system having processing components integrated in a housing with rotationally-coupled housing portions.

Referring now to FIG. 1, a block diagram depicts an information handling system 10 having processing components integrated in a housing with rotationally-coupled housing portions. In the example embodiment, information handling system 10 has a convertible configuration with a main housing portion 12 rotationally coupled to a lid housing portion 14 that rotates 360 degrees between closed and tablet orientations. In the example embodiment, main housing portion 12 integrates a motherboard 28 that interfaces processing components to process information. A central processing unit (CPU) 16 executes instructions to process information stored in random access memory (RAM) 18, such as instructions of an application stored in persistent memory of a solid state drive (SSD) 20. Information generated by CPU 16 is processed by a graphics processor unit 22 to generate pixel values that define visual images presented at a display 30. A chipset 24 includes a variety of processors, controllers and firmware components that cooperate to manage physical interfaces at the information handling system, such as with input/output and power devices. A wireless network interface card (WNIC) 26 provides wireless communication with external devices and networks, such as wireless local area networks (WLAN), wireless personal area networks (WPAN) and wireless wide area networks (WWAN). In different example embodiments, different types of processing components and housing configurations may be used.

In the example embodiment, main housing portion 12 and lid housing portion 14 rotationally couple with hinges 32 to rotate relative to each other between closed, open and tablet positions. Hinges 32 couple to hinge mounts 34 on each housing portion and have a dual axis as described below to support 360 degrees of relative motion. In the closed position, lid portion 14 brings display 30 over top of main portion 12 to protect display 12 and convert the system for portability. Lid portion 14 rotates approximately 90 degrees to a "clamshell" configuration that has display 30 held upright in a viewing position. In the clamshell orientation, a keyboard disposed over the processing components is in a convenient position to accept end user inputs. Lid portion 14 also rotates 360 degrees to expose display 30 in a tablet configuration, such as by rotating around main portion 12 about a dual axis hinge. At different rotational orientations, an end user tends to have different expectations regarding the tendency of display 30 to remain in a fixed position relative to main housing portion 12. For example, in a closed position users tend to expect some bias against movement so that the lid and main housing portions remain closed unless pulled apart yet are not too difficult to pull apart. As another example, in a clamshell rotational orientation, users tend to expect that display 30 will maintain a viewing position unless operated upon with an intentional force. In other words, users tend to want to rotate display 30 to a rotational orientation that provides ready viewing and then have display 30 stay in that rotational orientation until intentionally moved by the end user.

Figure 2:
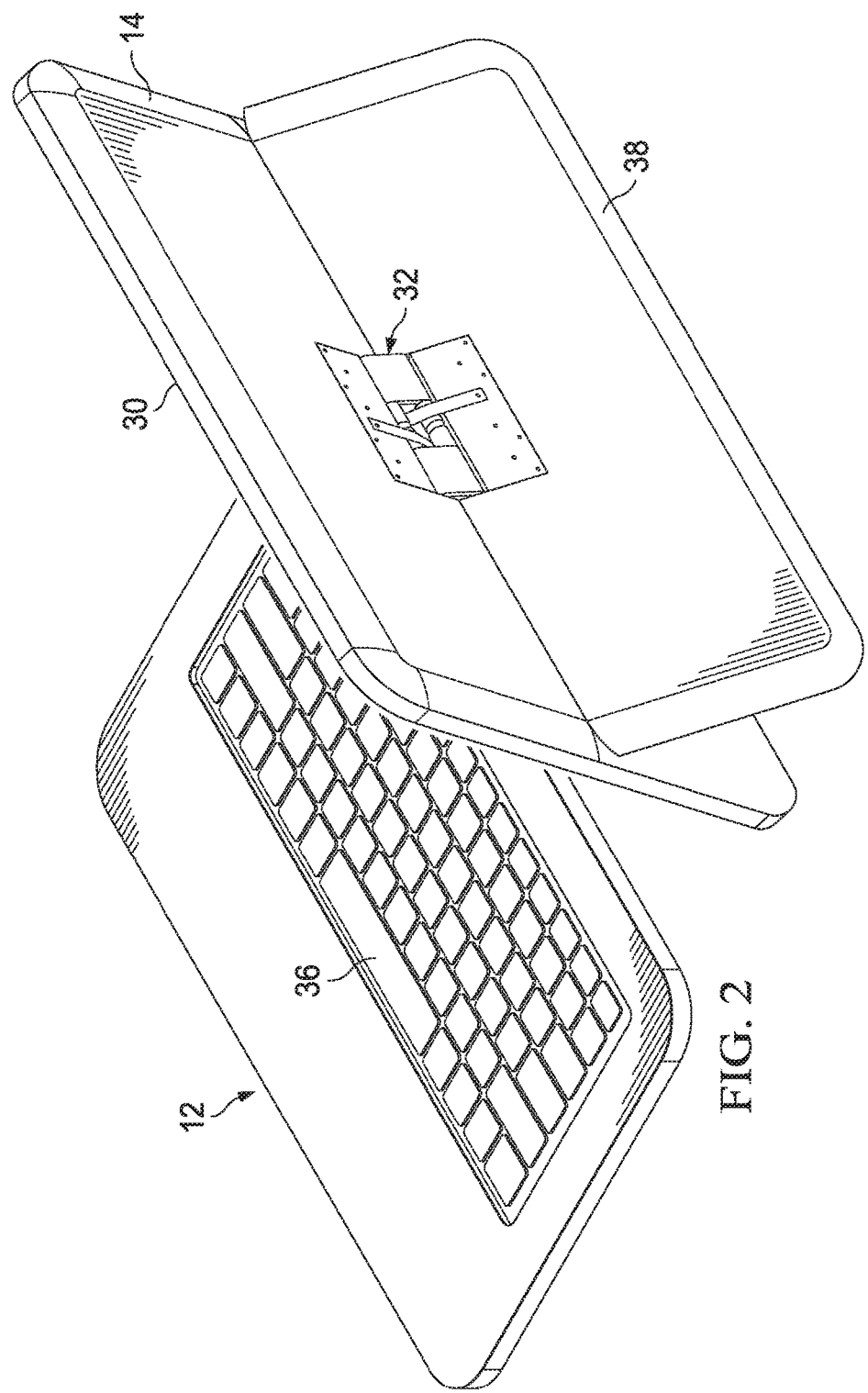
FIG. 2 depicts an information handling system held in a viewing position by a hinge with a separate keyboard housing portion.

Referring now to FIG. 2, an information handling system 10 is depicted held in a viewing position by a hinge with a separate keyboard housing portion 12. In the example embodiment, lid housing portion 14 includes the processing components in a tablet configuration that separates from the main housing portion 12 having a keyboard 36. Display 30 is held in a viewing position by a stand 38 that rotates outward from lid housing portion 14 about a hinge 32. The example embodiment illustrates that hinge 32 adapts to different functions in a portable information handling system by adapting the rotational angle at which the hinges provide increased torque. For example a 360 degree hinge with a detachable coupling provides rotation of main and lid housing portions while a 180 degree hinge provides rotational coupling of stand 38 to lid portion 14. The 360 degree hinge 32 may provide multiple high torque regions at typical rotational orientations used when viewing convertible systems, such as at clamshell and tablet orientations. The 180 degree hinge may provide high torque regions after stand 38 reaches a typical viewing angle and maintain high torque throughout an expected viewing angle range.

Referring now to FIG. 3, a side perspective view depicts two dual axis hinge assemblies 40 forming a hinge 32 over interconnecting base plates 46. Each dual axis assembly 40 has dual parallel axes 44 that couple to a support 42. Each support 42 includes coupling points to attach to opposing rotational bodies, such as with screws. In the example embodiment, first and second dual axis hinge assemblies are assembled in a parallel manner using base plates 50 that interconnect opposing sides of each dual axis assembly. Base plates 50 assemble to dual axis assemblies 40 to provide a contiguous hinge 32 from multiple hinge assemblies, thus simplifying manufacture and installation of hinges 32 into information handling systems 10. In one alternative embodiment, hinge assemblies 40 are installed separately into an information handling system to define a hinge 30, thus reducing the height of the completed hinge.

Dual axis assemblies 40 include preset friction devices that selectively increase frictional resistance to rotation at predetermined angles. A tensile member 48 couples to a front face of one support 42 and a rear face of an opposing support 42 for each dual axis assembly 40. For example, tensile member 48 is a para-aramid fiber, such as Kevlar, or a memory alloy, such as nickel titanium, or a high resilience thermoplastic. Tensile member 48 provides a spring-like bias against rotational movement and passes between the dual axles 44 of each hinge assembly so that movement of supports 42 and axles 44 of each assembly are synchronized as supports 42 rotate through 360 degrees of movement. The first and second dual axis assemblies 40 of hinge 32 are assembled to base plates 46 proximate to each other with the axles 44 aligned in a parallel manner to define a common rotational axis.

Referring now to FIG. 4, a side cutaway view depicts the hinge 32 having tensile members 48 coupled to opposing faces of each dual axis hinge assembly 40. Axles 44 rotate independently of each other without any geared connections. Tensile members 48 pass between axles 44 and couple to an upper surface of support 42 on one side of a dual axis assembly 40 and to a lower surface of base plate 46 on the other support 42 of the dual axis assembly. In alternative embodiments, tensile member 48 couples to the lower surface of support 42 and is trapped between the lower surface and base plate 46. Tensile member 48 couples in a fixed manner to the dual axis assembly 40, such as with an adhesive, welding or a screw. Tensile member 48 applies bias to opposing supports 42 of each dual axis assembly 40 so that rotational movement of an axle is translated to the other axle of the dual axis assembly in a synchronized manner. Similarly, base plates 46 coordinate movement of each dual axis assembly so that tensile members provide a synchronized motion of hinge 32 as a complete assembled unit. In particular, each axle 42 of each dual axis hinge assembly 40 biases to move in a synchronized manner even if different levels of friction are generated at different relative rotational angles. The translation of movement by tensile members 48 provide an inexpensive and robust synchronization mechanism without geared interconnections and having a low Z-axis height to adapt to small portable information handling system housings.

Figure 5:
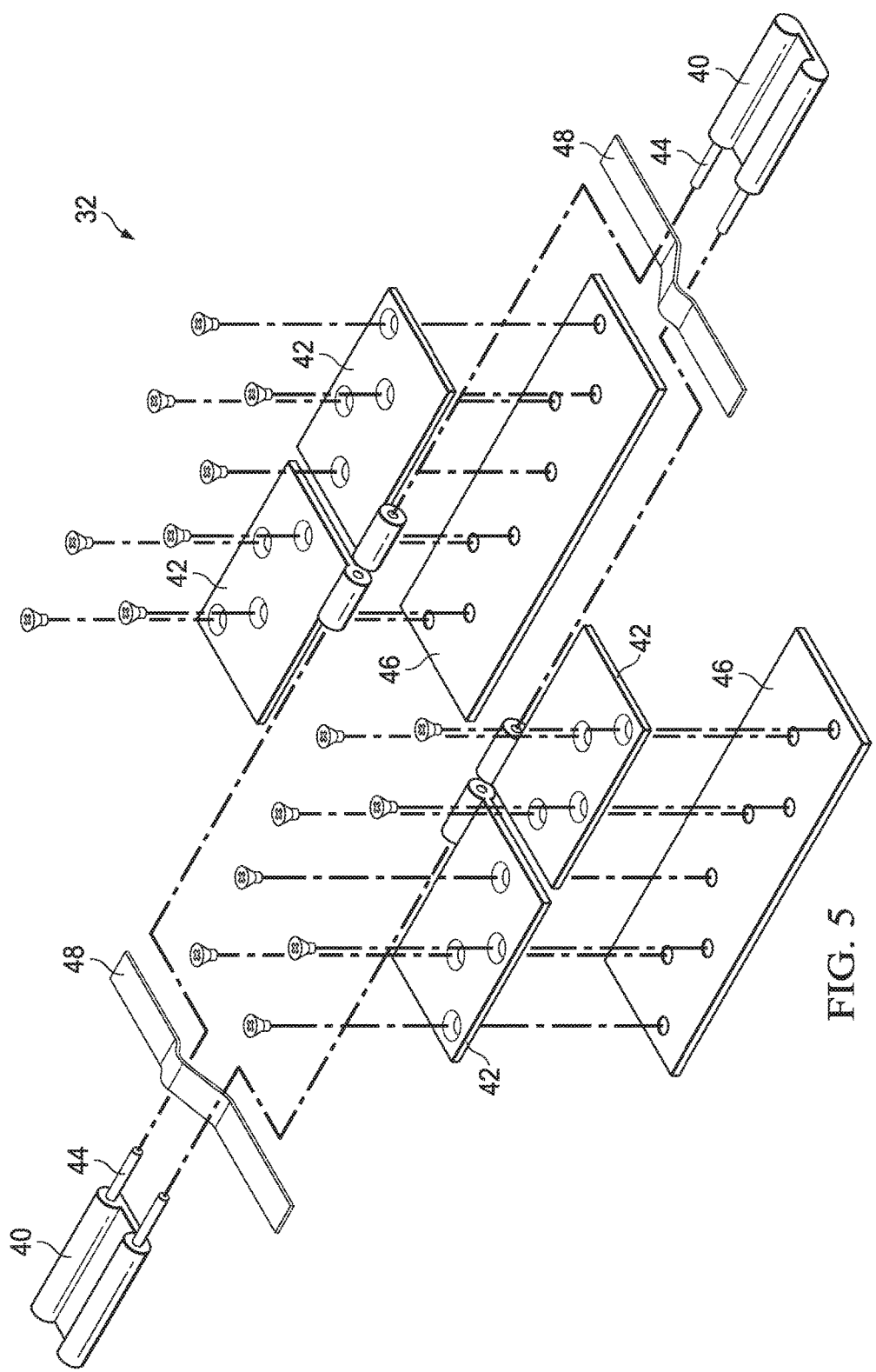
FIG. 5 depicts a blow up view of the hinge and dual axis hinge assemblies.

Referring now to FIG. 5, a blow up view depicts the hinge 32 and dual axis hinge assemblies 40. In the example embodiments, first and second dual axis assemblies are coupled to base plates 46 to from a single hinge with first and second tensile members 48 synchronizing hinge movement. In alternative embodiments, additional dual axis assemblies may be included to form the hinge with three or more dual axis assemblies 48. For example, dual axis assemblies 48 are acquired prefabricated to have integrated friction members that provide friction as defined relative angular rotational positions. A hinge 32 assembled from multiple dual axis assemblies 40 has the combined frictional response of the assembled dual axis assemblies 42 where each relative rotational position generates torque that opposes rotational motion based upon the integrated friction members and translates the torque across the hinge 32 as a whole unit. Thus the torque profile of a hinge 32 is defined by the dual axis hinge assemblies 40 included in the hinge 32. An information handling system that needs to hold a display in a desired set or relative rotational positions uses a hinge that has dual axis assemblies with the desired torque profile.

Figure 6:
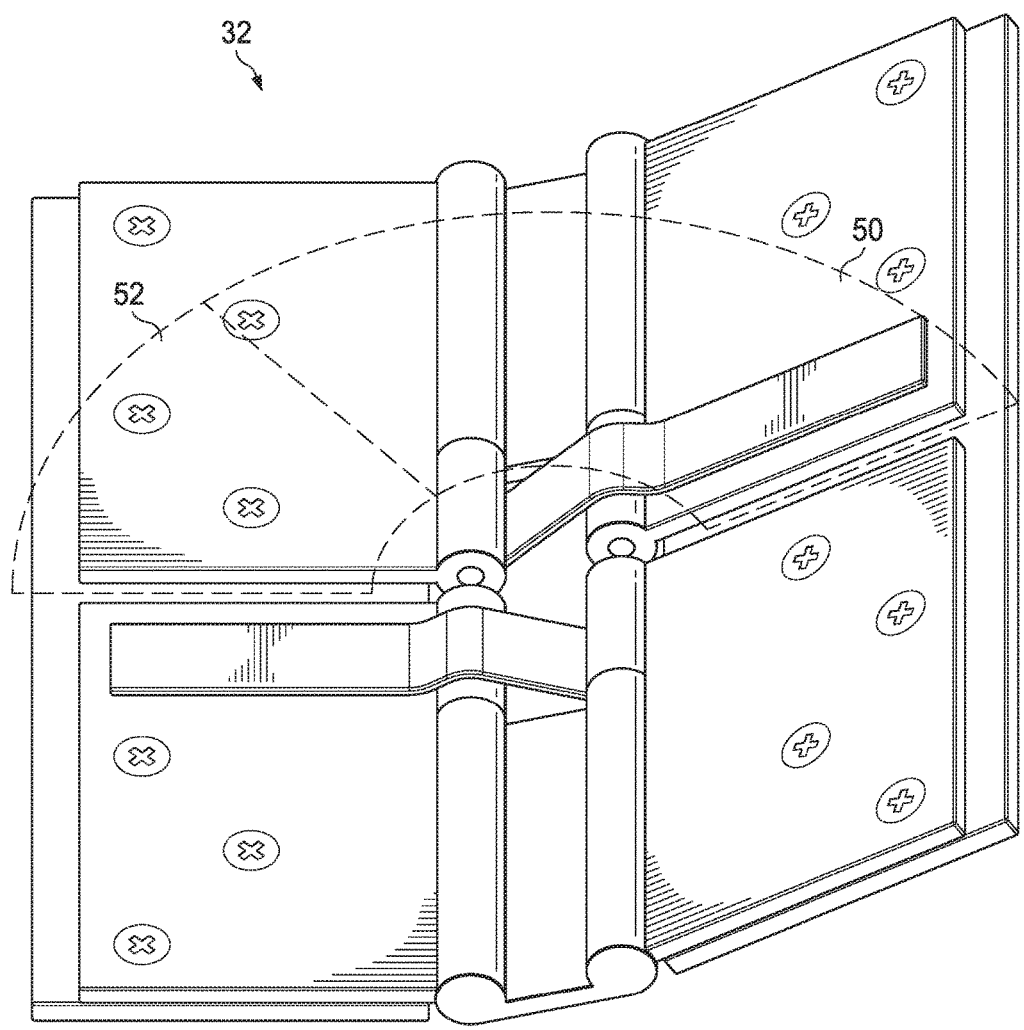
FIG. 6 depicts one example of high and low torque regions defined for the hinge by the dual axis hinge assemblies.
Figure 7A:
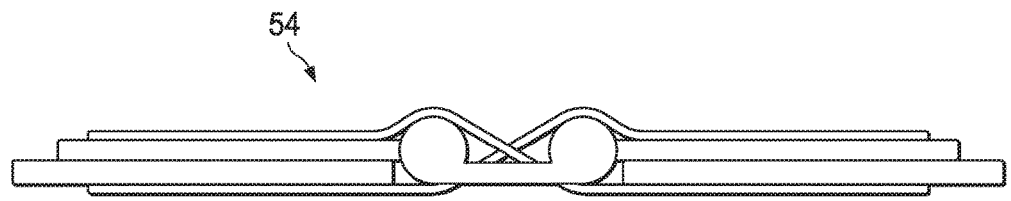
FIGS. 7A-7F, generally referred to as FIG. 7, depict an example embodiment of the hinge having variable torque regions throughout the rotational motion of the housing portions.
Figure 7B:
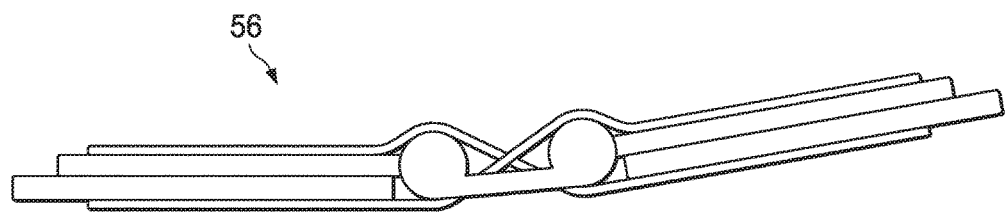
Figure 7C:
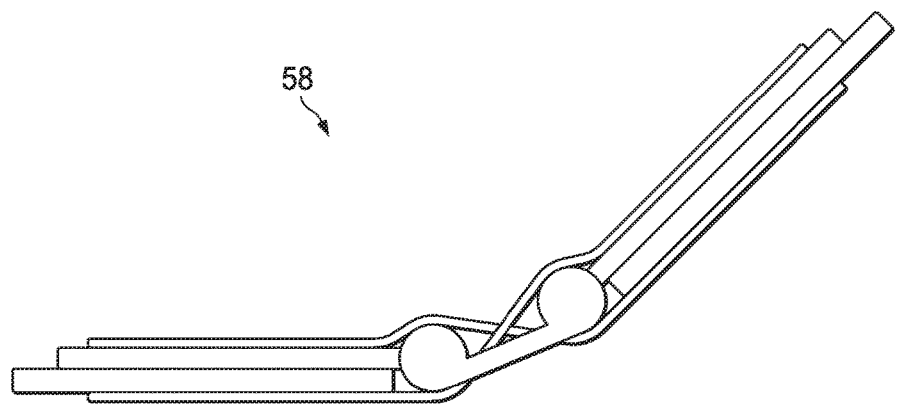
Figure 7E:
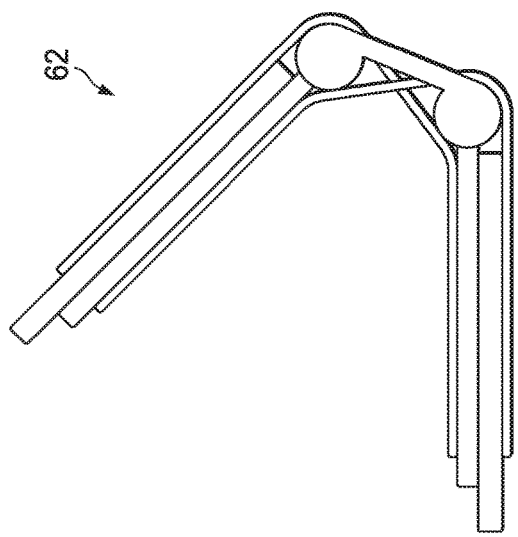
Figure 7F:
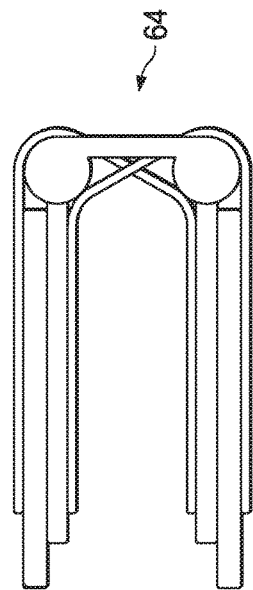
Figure 7D:
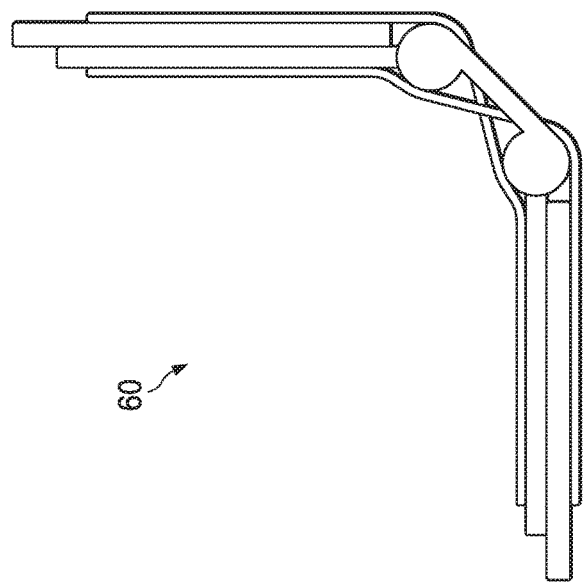

Referring now to FIG. 6, one example is depicted of high and low torque regions defined for the hinge by the dual axis assemblies 40. In the example embodiment, a low torque region 50 starts after an initial rotation of approximately 20 degrees from a flat orientation. For example, on dual axis assembly 40 has friction members that provide friction in the low torque region 50 while the other dual axis assembly 40 does not have friction applied in the low torque region 50. As hinge 32 rotates to approximately 135 degrees, the second dual axis assembly introduces friction to oppose rotational motion in addition to the friction of the first dual axis assembly to create a high torque region 52. The example embodiment provides hinge movement adapted to hold a tablet information handling system in a viewing position. The amount and location of rotational movement associated with low torque region 50 and high torque region 52 are adapted by selecting dual axis assemblies with defined friction characteristics for the desired housing motion. Thus, for instance, hinge 32 in the example embodiment could instead have similar torque regions at the initial rotation of the hinge and no torque in middle rotational angles so that a stand readily adapts to reversed vertical orientations of the tablet information handling system. In one example embodiment each dual axis assembly includes multiple friction devices that provide multiple rotation regions of increased torque. In various embodiments, cost and size constraints may drive the inclusion of a lesser number of more complex dual axis assemblies versus a greater number of more simple dual axis assemblies that each include fewer friction regions. Friction within a dual axis assembly may be provided any number of conventional friction devices that operate on one or both axels 44.

Referring now to FIG. 7, an example embodiment depicts the hinge 32 having variable torque regions throughout the rotational motion of the housing portions. Starting at element 54 and proceeding through element 64 various rotational angles and their associated torques are depicted for a convertible information handling system rotating 180 degrees from a fully open to a closed position. Similar torque values are provided for rotation from closed to open positions and may be provided through 360 degrees of rotational travel.

Initially in the fully open position 54 no friction is created so that an end user may easily lift the housing portion from a flat surface. As the housing portion rotates to and past 10 degrees, the first dual axis assembly of the hinge engages a friction device to provide approximately 3 kgfm of torque. The first dual axis assembly maintains the constant torque for the remainder of the rotation of the housing portions to the closed position. In a vertical orientation commonly used for viewing the display, the torque of just one dual axis assembly is sufficient to maintain the housing orientation. As the housing portions rotate approximately 135 degrees at step 62, the friction device of the second dual axis assembly engages to provide additional torque against housing rotation until the closed position is reached. The increased torque associated with the closed position prevents undesired opening of the information handling system while in a portable state. In the example embodiment of FIG. 7, rotational torque is provided from each of two dual axis assemblies in one rotational region each only to provide three different levels of rotational torque. In alternative embodiments, alternative types of torque regions may be defined with alternative structures. For instance, each dual axis assembly may include a friction device on each axle so that each dual axis assembly has two torque regions that may or may not overlap, thus allowing up to four separate torque regions and an even greater number of mixed torque regions. Alternatively or in addition, more than two dual axis assemblies may be used to define additional torque regions. In some less complex housing arrangements, a single dual axis assembly may form the hinge with the tensile member providing synchronized motion.

Although the present invention has been described in detail, it should be understood that various changes, substitutions and alterations can be made hereto without departing from the spirit and scope of the invention as defined by the appended claims.

What is claimed is:

1. An information handling system comprising:
    a housing adapted to contain processing components and having a first and a second portion;
    the processing components disposed in the second portion of the housing including at least a processor and memory that cooperate to process information;
    a display integrated in the first portion of the housing and interfaced with the processing components to present information as visual images; and
    a hinge rotationally coupling the first portion and the second portion of the housing to each other,
    the hinge having a first dual axis assembly and a second dual axis assembly,
    the first dual axis assembly and the second dual axis assembly are in parallel alignment;
    the first dual axis assembly having a first axis coupled to a first support, a second axis coupled to a second support, and
    the second dual axis assembly having a first axis coupled to a third support, a second axis coupled to a fourth support; and
    a first tensile member coupled to the first support and the second support,
    the first support having a planar shape with a rear face coupled against the first portion of the housing and a front face exposed at the first portion of the housing, the second support having a planar shape with a rear face coupled against the second portion of the housing and a front face exposed at the second portion of the housing, the first tensile member coupled to the front face of the first support and the rear face of the second support;
    a second tensile member coupled to the third support and the fourth support, the third support having a planar shape with a rear face coupled against the first portion of the housing and a front face exposed at the first portion of the housing, the fourth support having a planar shape with a rear face coupled against the second portion of the housing and a front face exposed at the second portion of the housing, the second tensile member coupled to the rear face of the third support and the front face of the fourth support; and
    the first tensile member and the second tensile member are aligned in parallel to each other.

2. The information handling system of claim 1, wherein the first portion and the second portion of the housing further comprise:
    a lid portion integrating the display; and
    a main portion having a keyboard, the hinge rotationally coupling the lid and main portion to each other for rotation between open and closed positions.

3. The information handling system of claim 1, wherein the first portion and the second portion of the housing further comprise:
    a lid portion integrating the display; and
    a stand portion that rotationally extends from and retracts into the lid portion, the stand portion holding the lid portion in an elevated position when extended from the lid portion.

4. The information handling system of claim 1, wherein the first dual axis assembly and the second dual axis assembly each include friction members, the friction members applying friction at common rotational orientations.

5. The information handling system of claim 1, wherein the first dual axis assembly and the second dual axis assembly each include friction members, the friction members applying friction at different rotational orientations.

6. The information handling system of claim 1, wherein the first tensile member and the second tensile member comprise nickel titanium.

7. The information handling system of claim 1, wherein the first tensile member and the second tensile member comprise an elastic thermoplastic.

8. The information handling system of claim 1, further comprising:
    a first baseplate coupled to the first support of the first dual axis assembly and the third support of the second dual axis assembly; and
    a second baseplate coupled to the second support of the first dual axis assembly and the fourth support of the second dual axis assembly.

9. The information handling system of claim 1, wherein:
    the first dual axis assembly has a first friction zone at the first axis and a second friction zone at the second axis;
    the second dual axis assembly has a third friction zone at the first axis and a fourth frictions zone at the second axis; and
    the friction zones define four separate increased torque regions at predetermined rotational orientations of the hinge.

10. A hinge comprising:
    a first dual axis assembly and a second dual axis assembly, the first dual axis assembly and second dual axis assembly are in parallel alignment;

the first dual axis assembly having a first axis coupled to a first support, a second axis coupled to a second support, and the second dual axis assembly having a first axis coupled to a third support, a second axis coupled to a fourth support; and a first base coupled to the a rear face of the first support and the third support of the first dual axis assembly; a second base coupled to the a rear face of the second support and fourth support of the second dual axis assembly, the first base and the second base are holding the first dual axis assembly and the second dual axis assembly in parallel alignment;

the first base comprises a first portion of an information handling system housing; and the second base comprises a second portion of the information handling system housing, the hinge rotationally coupling the first portion and the second portion of the information handling system housing to each other;

a first tensile member coupled to the first support and the second support, the first support having a planar shape with a rear face coupled against the first portion of the an information handling system housing and a front face exposed at the first portion of the an information handling system housing, the second support having a planar shape with a rear face coupled against the second portion of the an information handling system housing and a front face exposed at the second portion of the an information handling system housing, the first tensile member coupled to the front face of the first support and the rear face of second support;

a second tensile member coupled to the third support and the fourth support, the third support having a planar shape with a rear face coupled against the first portion of the an information handling system housing and a front face exposed at the first portion of the an information handling system housing, the fourth support having a planar shape with a rear face coupled against the second portion of the an information handling system housing and a front face exposed at the second portion of the an information handling system housing, the second tensile member coupled to the rear face of the third support and the front face of the fourth support; and the first tensile member and the second tensile member are aligned in parallel to each other.

11. The hinge of claim 10, wherein:

the first base comprises an information handling system; and the second base comprises a viewing stand rotationally coupled to the information handling system housing to hold the information handling system in an elevated position.

12. The hinge of claim 10, wherein the first tensile member and the second tensile member comprise nickel titanium alloy.

13. The hinge of claim 10, further comprising:

a first torque region associated with the first dual axis assembly and providing increased resistance to rotation through a first rotational range of motion; and a second torque region associated with the second dual axis assembly and providing increased resistance to rotation through a second rotational range of motion; wherein the first and second torque regions overlap across some but not all of the first rotational range of motion and the second rotational range of motion.

14. The hinge of claim 10, further comprising:

a first torque region associated with the first dual axis assembly and providing increased resistance to rotation through a first rotational range of motion; and a second torque region associated with the second dual axis assembly and providing increased resistance to rotation through a second rotational range of motion wherein the first and second torque regions operate over different and separate rotational ranges of motion.

* * * * *

UNITED STATES PATENT AND TRADEMARK OFFICE
CERTIFICATE OF CORRECTION

PATENT NO. : 10,310,556 B2  Page 1 of 1
APPLICATION NO. : 15/711023
DATED : June 4, 2019
INVENTOR(S) : Christopher T. Barnard It is certified that error appears in the above-identified patent and that said Letters Patent is hereby corrected as shown below:

In the Claims

In Column 9, Line 27, please remove "an" after "the";
　　Line 29, please remove "an" after "the";
　　Line 31, please remove "an" after "the";
　　Line 38, please remove "an" after "the";
　　Line 39, please remove "an" after "the";
In Column 10, Line 2, please remove "an" after "the";
　　Line 4, please remove "an" after "the".

Signed and Sealed this
Third Day of September, 2019

Andrei Iancu
*Director of the United States Patent and Trademark Office*